Figure 1:
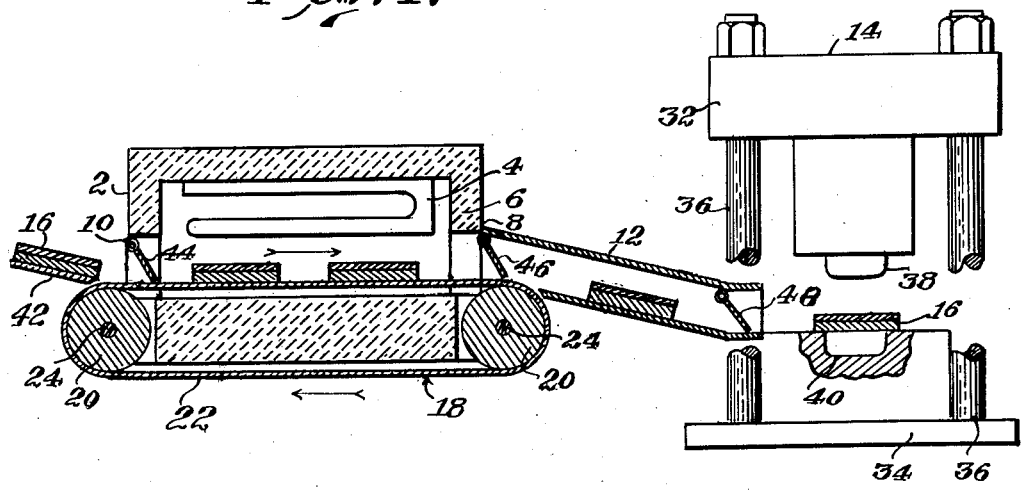

March 26, 1957  R. R. FAYLES  2,786,266

METHOD OF CLAD FABRICATION

Filed Aug. 5, 1955

INVENTOR.
R. Russell Fayles.
BY
Attorney.

2,786,266
Patented Mar. 26, 1957

2,786,266
METHOD OF CLAD FABRICATION

Robert Russell Fayles, Coatesville, Pa., assignor to Lukens Steel Company, Coatesville, Pa., a corporation of Pennsylvania Application August 5, 1955, Serial No. 526,648

1 Claim. (Cl. 29—475)

This invention relates to methods of cladding metal and more particularly to methods of cladding and forming metallic pieces in a single operation.

The principal object of the invention is to first heat two or more metallic pieces in a furnace and then pass them to a press where they are pressed to weld them together.

Another object of the invention is to permanently weld the base metal piece and the clad metal piece together, while at the same time forming the shape desired.

Still another object of the invention is to increase the production of cladded bodies at a reduced cost.

Other objects will appear hereinafter throughout the specification.

Figure 2:
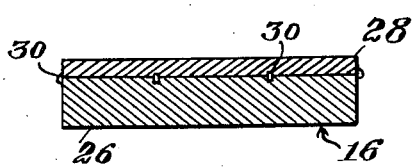

In the drawings:

Figure 1 is a side elevational view showing parts broken away and in section; and Figure 2 is a vertical section through one of the metallic members before being pressed but with its two parts tack welded together.

The apparatus for carrying out the improved methods includes a furnace 2 preferably heated by electrical heating elements 4 mounted in the upper portion of the chamber 6. Openings 8 and 10 are provided in the ends of the furnace, the opening 8 being in communication with a downwardly inclined sealed chamber 12 which terminates at its lower end in a hydraulic press 14 of conventional form. The opening 10 constitutes the inlet to the furnace through which the base metal and clad metal pieces 16 are fed.

These pieces 16 are conveyed through the furnace by an endless conveyor 18 which comprises two rollers 20 one at each end of the furnace and over which an endless belt 22 passes. The rollers may be of any suitable construction and are mounted on axes 24 which may be supported in any suitable manner. Each of the metal pieces 16 comprises a base metal layer 26 of steel and a layer of clad material 28. Before being fed to the furnace, these layers are tack welded together, as indicated at 30 in Figure 2, in order to hold them in alignment until welded in the press. The direction of movement of the endless belt and the pieces 16 is indicated by the arrows shown in Figure 1.

Since the press is conventional in form, only such parts as are necessary to carry out the method are shown. As shown, it includes a head 32 and a base 34 connected together by bolts 36. The head carries a reciprocable upper platen 38 adapted to engage the top of the pieces 16 as they come from the furnace and press them against the lower platen 40, welding them together and causing them to take whatever form the opposed faces of the platens may have.

Any suitable means may be used to feed the pieces 16 into the furnace, such as the chute 42 shown in Figure 1.

The openings 8 and 10 in the side walls of the furnace are closed by pivotally mounted doors 46 and 44, respectively. These doors are inclined in the direction of movement of the metal pieces 16 and are hinged at their top edges so that they are automatically opened as the pieces pass into and out of the furnace. A similar door 48 is mounted in the lower end of the inclined chamber 12, and is automatically opened by the metal pieces as they pass to the press.

Operation

After the base and clad metal layers are properly sized and matched, they are tack welded at points to hold them together as they are being passed through the furnace and to the press. They are fed to the furnace by the chute 42 and onto the endless conveyor which carries them through the furnace to the inclined floor of the chamber 12 down which they slide to the press. An inert atmosphere, such as nitrogen, is maintained in the furnace chamber 6 as the pieces are being heated therein to a temperature of about 2200° F.

From the chamber 6, the pieces 16 pass into the chamber 12 in which an oxygen-free atmosphere is maintained, and then to the press where they are formed to the desired shape and their layers welded together throughout substantially their entire contacting areas.

My invention also includes a second method in which the steps are the same as that described above except in the preparation of the pieces before they are assembled in pairs. In this method the surfaces of the steel and alloy pieces to be bonded are painted with a nickel paint consisting of pure, powdered nickel mixed with a suitable vehicle. This paint protects the surfaces against any oxidizing effect and improves the bonding qualities of the metals.

My invention also includes a third method, which includes the step of nickel plating the cladding metal before it is placed in the pack of the other two methods.

While the furnace has been shown as being of the travelling conveyor type, any other suitable means may be used for moving the metallic pieces through the furnace.

It will be understood that the platens of the press may be modified to form any shape or pattern desired, or the welded pieces may be left in a flat condition.

The above description and drawing disclose a single embodiment of the invention, and specific language has been employed in describing the figures. It will, nevertheless, be understood that no limitations of the scope of the invention are thereby contemplated, and that various alterations and modifications may be made such as would occur to one skilled in the art to which the invention relates.

I claim:

A method of cladding and forming metal comprising, sizing and matching a base metal piece and a clad metal piece to give them substantially the same lateral extent, painting the contacting surfaces of said pieces with a nickel paint comprising powdered nickel mixed with a suitable vehicle, tack welding said pieces together to hold them in alignment, providing a furnace having an inlet and an outlet for said pieces, maintaining an atmosphere in said furnace inert to the metals of said pieces, providing said inlet and said outlet with automatically actuated doors adapted to be opened by said pieces as they pass into and out of said furnace and to close by gravity, providing a sealed chute extending from said outlet to a press, maintaining an oxygen-free atmosphere in said chute, feeding said pieces to said furnace, moving said pieces through said furnace on an endless conveyor while heating them to a temperature of approximately 2200° F., passing said pieces while in their heated condition through said chute and to said press, and pressing said pieces to weld them together throughout substantially their entire contacting areas and forming them to the shape desired.

References Cited in the file of this patent

UNITED STATES PATENTS

| | | |
|---|---|---|
| 1,152,610 | De Bats | Sept. 7, 1915 |
| 2,383,766 | Brassert | Aug. 28, 1945 |
| 2,473,712 | Kinney | June 21, 1949 |
| 2,647,789 | Frost | Apr. 13, 1954 |
| 2,707,323 | Watson | May 3, 1955 |